United States Patent [19]

Davis

[11] Patent Number: 5,699,484

[45] Date of Patent: Dec. 16, 1997

[54] METHOD AND APPARATUS FOR APPLYING LINEAR PREDICTION TO CRITICAL BAND SUBBANDS OF SPLIT-BAND PERCEPTUAL CODING SYSTEMS

[75] Inventor: Mark Franklin Davis, Pacifica, Calif.

[73] Assignee: Dolby Laboratories Licensing Corporation, San Francisco, Calif.

[21] Appl. No.: 638,498

[22] Filed: Apr. 26, 1996

Related U.S. Application Data

[63] Continuation of PCT/US95/16748 Dec. 20, 1995 continuation-in-part of Ser. No. 360,150, Dec. 20, 1994, abandoned.

[51] Int. Cl.[6] ................ G10L 3/02; G10L 9/00
[52] U.S. Cl. ............ 345/2.28; 395/2.38; 395/2.29; 395/2.39; 395/2.91
[58] Field of Search ................ 395/2.28, 2.38, 395/2.39, 2.14, 2.2, 2.21, 2.29; 381/29–41

[56] References Cited

U.S. PATENT DOCUMENTS

| | | | |
|---|---|---|---|
| 4,677,671 | 6/1987 | Galand et al. | 395/2.21 |
| 4,751,736 | 6/1988 | Gupta et al. | 395/2.39 |
| 5,185,800 | 2/1993 | Mahieux | 395/2.91 |
| 5,274,740 | 12/1993 | Davis et al. | 395/2.39 |
| 5,291,557 | 3/1994 | Davis et al. | 292/161 |
| 5,394,473 | 2/1995 | Davidson | 381/36 |
| 5,451,954 | 9/1995 | Davis et al. | 341/200 |

OTHER PUBLICATIONS

Princen, et al., "Analysis/Synthesis Filter Bank Design Based on Time Domain Aliasing Cancellation," *IEEE Acoust., Speech and Sig. Proc.*, vol. ASSP-34, Oct. 1986, pp. 1153–1161.

"Survey of Adaptive Image Coding Techniques," *IEEE Trans. on Communications*, vol. COM-25, Nov. 1977, pp. 1275–1284.

"Principal–components Analysis for Low–Redundancy Encoding of Speech Spectra," *J. Acoust. Soc. Am.*, Mar. 1981, vol. 69, pp. 832–845.

Messerschmitt, "Adaptive Filters–Structures, Algorithms and Applications," Klunes Academic Publishers, 1984, pp. 49–62.

Widrow and Stearns, "Adaptive Signal Processing," Prentice–Hall, 1985, pp. 99–116.

N. Yamane, et al., "A New Image Data Compression Method–Extrapolative Prediction–Discrete Sine Transform Coding," *Elec. and Comm. in Japan*, part 1, vol. 70, No. 12, Dec. 1987, pp. 61–74.

V.Lazzari, M.Quacchia, D.Sereno and E.Turco, "Implementation of a Real Time 16 kBits/s SB–APC Codec for Digital Mobile Radio Systems," *IEEE Int. Conf. Comm.*, vol. 3, Jun. 1988, pp. 1614–1618.

V.Lazzari, R.Montagna and D.Sereno, "Two Speech Coders for Digital Mobile Radio," *CSELT Tech. Reports*, vol. XVI, No. 6, Oct. 1988, pp. 563–572.

T.Mochizuki and J.Ohki, "Feedforward Control of Hybrid Transform/Predictive Coder," *SPIE Conf. Visual Comm. and Image Proc.*, vol. 1001, Nov. 1988, pp. 826–833.

Y.Mahieux, J.P.Petit and A.Charbonnier, "Transform Coding of Audio Signals Using Correlation Between Successive Transform Blocks," *IEEE Int. Conf. Acoust., Speech and Sig. Proc.*, May 1989, pp. 2021–2024.

(List continued on next page.)

*Primary Examiner*—Allen R. MacDonald
*Assistant Examiner*—Patrick N. Edouard
*Attorney, Agent, or Firm*—Thomas A. Gallagher; David N. Lathrop

[57] ABSTRACT

A split-band perceptual coding system utilizes generalized waveform predictive coding in frequency bands to further reduce coded signal information requirements. The system including frequency subband each having a bandwidth commensurate with or less than a corresponding critical band of human perception. The order of the predictors are selected to balance requirements for prediction accuracy and rapid response time. Predictive coding may be adaptively inhibited in a band during intervals in which no predictive coding gain is realized.

41 Claims, 6 Drawing Sheets

OTHER PUBLICATIONS

N.Yamane, et al., "An Image Data Compression Method Using Extrapolative Prediction–Discrete Sine Transform Coding," *Elec. and Comm. in Japan*, part 1, vol. 72, No. 6, Jun. 1989, pp. 84–93.

P.C.Ching and K.C.Ho, "An Efficient Adaptive LSP Method for Speech Encoding", *IEEE Reg. 10 Conf. Comp. and Comm. Sys.*, vol. 1, Sep. 1990, pp. 324–328.

Mahieux, et al.; "Transform Coding of Audio Signals at 64 kBit/s," *Proc. IEEE Globecom*, Dec. 1990, vol. 2, pp. 518–522.

X.Lin and R.Steele, "Subband Coding with Modified Multipulse LPC for High Quality Audio," *IEEE Int. Conf. Acoust., Speech and Sig. Proc.*, vol. 1, Apr. 1993, pp. 201–204.

X.Lin, L.Hanzo, R.Steele and W.T.Webb, "Subband–Multipulse Digital Audio Broadcasting for Mobile Receivers," *IEEE Trans. on Broadcasting*, vol. 39, Dec. 1993, pp. 373–382.

J.D.Johnston, "Estimation of Perceptual Entropy Using Noise Masking Criteria," *IEEE*, Sep. 1988, pp. 2524–2527.

D.A.Reynolds and M.J.T.Smith, "Analysis/Synthesis Image Coding System Based on Time Domain Aliasing Cancellation," *IEEE Proc., 1989 Souteastcon*, May 1989, pp. 866–871.

P.Duhamel, Y.Mahieux, J.P.Petit, "A Fast Algorithm for the Implementation of Filter Banks Based on Time Domain Aliasing Cancellation," *IEEE Trans. on Acost., Speech and Sig. Proc.*, Jul. 1991, pp. 2209–2212.

METHOD AND APPARATUS FOR APPLYING LINEAR PREDICTION TO CRITICAL BAND SUBBANDS OF SPLIT-BAND PERCEPTUAL CODING SYSTEMS

CROSS-REFERENCE TO RELATED APPLICATIONS

This application is a continuation of International Patent Application No. PCT/US 95/16748 filed Dec. 20, 1995, which designates the United States for filing a continuation-in-part of U.S. patent application Ser. No. 08/360,150 filed Dec. 20, 1994, now abandoned.

TECHNICAL FIELD

The invention relates in general to low bit-rate encoding and decoding of signals such as audio signals. More particularly, the invention relates to lowering information capacity requirements by applying prediction in high-quality split-band perceptual coding systems.

BACKGROUND

There is considerable interest among those in the fields of audio-signal processing to minimize the amount of information required to represent a signal without perceptible loss in signal quality. By reducing information requirements, signals impose lower information capacity requirements upon communication channels and storage media.

Analog signals which have been subject to compression or dynamic range reduction, for example, impose lower information capacity requirements than such signals without compression. Digital signals encoded with fewer binary bits impose lower information capacity requirements than coded signals using a greater number of bits to represent the signal. Of course, there are limits to the amount of reduction which can be realized without degrading the perceived signal quality. The following discussion is directed more particularly to digital techniques, but it should be realized that corresponding considerations could be applied to analog techniques as well.

Information capacity requirements can be reduced by applying either of two types of so-called "data compression" techniques. One type of compression technique, sometimes referred to as "lossy" compression techniques, reduces information capacity requirements in a manner which does not assure, and generally prevents, perfect recovery of the original signal. Quantization is one well known lossy compression technique.

Quantization can reduce information capacity requirements by reducing the number of bits used to represent each sample of a digital signal, thereby reducing the accuracy of the digital signal representation. In audio coding applications, the reduced accuracy or quantizing error is manifested as quantizing noise. If the errors are of sufficient magnitude, the quantizing noise will degrade the subjective quality of the coded signal.

Various audio coding techniques attempt to apply lossy compression techniques to an input signal without suffering any perceptible degradation by removing components of information which are imperceptible or irrelevant to perceived coding quality. A complementary decoding technique can recover a replica of the input signal which is perceptually indistinguishable from the input signal provided the removed component is truly irrelevant. Examples of such coding techniques include split-band filtering with adaptive bit allocation based upon psycho-perceptual principles.

In audio applications, for example, the human auditory system displays frequency-analysis properties resembling those of highly asymmetrical tuned filters having variable center frequencies and bandwidths that vary as a function of the center frequency. The ability of the human auditory system to detect distinct tones generally increases as the difference in frequency between the tones increases; however, the resolving ability of the human auditory system remains substantially constant for frequency differences less than the bandwidth of the above mentioned filters; thus, the frequency-resolving ability of the human auditory system varies according to the bandwidth of these filters throughout the audio spectrum. The effective bandwidth of such an auditory filter is referred to as a "critical band." A dominant signal within a critical band is more likely to mask the audibility of other signals anywhere within that critical band than it is likely to mask other signals at frequencies outside that critical band. A dominant signal may mask other signals which occur not only at the same time as the masking signal, but also which occur before and after the masking signal. The duration of pre- and postmasking effects depend upon the magnitude of the masking signal, but premasking effects are usually of much shorter duration than postmasking effects. See generally, the *Audio Engineering Handbook*, K. Blair Benson ed., McGraw-Hill, San Francisco, 1988, pages 1.40–1.42 and 4.8–4.10.

No simple psychoacoustic model exists for establishing the audibility of the spectral components of an audio signal. The bandwidths of the critical bands and the temporal masking intervals vary considerably with frequency and amplitude of the masking signal, vary among individual listeners, and are the subject of some debate. Nevertheless, certain values are commonly used in psychoacoustic-based coder design and are useful engineering approximations. The critical bands are generally regarded to be somewhat constant and less than 100 Hz at frequencies below about 500 Hz. The critical bands vary as a fraction of center frequency for frequencies above about 500 Hz, starting at about one-third octave at 500 Hz, decreasing to about one-fifth octave for frequencies between 1 kHz and 4 kHz, and increasing to about one-third octave for frequencies above about 10 kHz. The premasking interval can extend beyond 100 msec. but is generally regarded to be limited to less than 5 msec. The postmasking interval can extend beyond 500 msec. but is generally regarded to be limited to about 50 msec.

Audio split-band coding techniques which divide the useful bandwidth into frequency subbands with bandwidths approximating the critical bands of the human auditory system can better exploit psychoacoustic effects than wider band techniques. Such split-band coding techniques, in concept, comprise passing an input signal through a filter bank, reducing the information capacity requirements of the signal passed by each filter band to such an extent that degradation is just inaudible, and reconstructing a replica of the input signal with an inverse process. Two such techniques are subband coding and transform coding. Audio subband and transform coders can reduce information requirements in particular frequency subbands where the resulting artifacts are psychoacoustically masked by one or more spectral components and, therefore, do not degrade the subjective quality of the encoded signal.

Subband coders may use any of various techniques to implement a filter bank with analog or digital filters. In digital subband coders, an input signal comprising signal samples is passed through a bank of digital filters. Each subband signal passed by a respective filter in the filter bank is downsampled according to the bandwidth of that subband's filter. The coder attempts to quantize the samples of each subband signal using just enough bits to render the quantizing noise imperceptible. Each subband signal comprises samples which represent a portion of the input signal spectrum.

Transform coders may use any of various so-called time-domain to frequency-domain transforms to implement a bank of digital filters. Individual coefficients obtained from the transform may be considered "subbands," or two or more adjacent transform coefficients may be grouped together to define "subbands" having effective bandwidths which are sums of individual transform coefficient bandwidths. The transform coefficients in a subband constitute the samples of that respective subband signal. The coder attempts to quantize the transform coefficients in each subband using just enough bits to render the quantizing noise imperceptible.

Block transforms operate on a block or interval of time-domain information, transforming it into a block of transform coefficients representing frequency-domain spectral information. The length of the time-domain block affects both the temporal resolution and the spectral resolution of the transform filter bank. An increase in block length increases spectral resolution but also increases the computational requirements and processing delay through the filter bank. Higher spectral resolution facilitates exploitation of psycho-perceptual effects by permitting the use of more accurate perceptual models. Unfortunately, an increase in block length also decreases temporal resolution of the filter bank. The effects of quantization errors resulting from abrupt events in a block such as transients are spread across the block; if the block is too long, the errors will extend beyond the temporal masking interval of the human auditory system. In addition, coarse temporal resolution is a serious disadvantage in some applications such as editing systems requiring extraction of coded signal segments at precise moments in time.

Throughout the following discussion, the term "split-band coder" shall refer to subband coders, transform coders, and other coding techniques which operate upon portions of the useful signal bandwidth. The term "subband" shall refer to these portions of the useful signal bandwidth, whether implemented by a true subband filter bank, a transform filter bank, or other filtering technique. The term "subband signal sample" and the like as used throughout this discussion refers to both a sample obtained from passband filters as well as to coefficients obtained from transforms unless the context of the discussion makes it clear that a distinction is being made.

A second type of compression technique, sometimes referred to as "lossless" compression techniques, reduces information capacity requirements without degradation by decorrelating the original signal, thereby reducing or eliminating components of the signal which are redundant. A complementary decompression technique can recover the original signal perfectly by providing the redundant component removed during compression. Examples of lossless compression techniques include run-length encoding, linear predictive coding (LPC), and transform coding.

In principle, an encoder utilizing LPC predicts some aspect of an original signal, establishes a "prediction error" from the difference between the prediction and the original signal and passes the prediction error to a companion decoder. The decoder performs a corresponding prediction and adjusts the prediction according to the prediction error received from the encoder to recover perfectly the original signal.

A wide variety of LPC techniques are well known. For example, see Widrow and Stearns, "Adaptive Signal Processing," Prentice-Hall, 1985, pp. 99–116 and Honig and Messerschmitt, "Adaptive Filters-Structures, Algorithms and Applications," Klunes Academic Publishers, 1984, pp. 49–62, and FIG. 3–5, all of which are incorporated by reference in their entirety.

The linear prediction is fundamentally the same as filtering; therefore, filter characteristics such as frequency response and stability in addition to predictive characteristics such as prediction accuracy are pertinent considerations for LPC. In digital embodiments, recursive and/or nonrecursive filters can be used to implement LPC. Higher-order predictive filters are able to predict complex signals more accurately but have a longer response time. In addition, higher-order filters impose greater computational requirements.

Throughout this discussion, terms referring to "prediction accuracy," "prediction error" and the like relate to the difference between a prediction and the respective original signal. The magnitude of the prediction error varies inversely with the accuracy of the predictor. The term "response time" and the like refers to the length of time required for a predictor to minimize the prediction error to a substantially steady-state value following a highly nonstationary event such as a transient.

Transforms can provide lossless compression of information by decorrelating the information into a set of principal components. For example, an audio signal can be expressed as a set of harmonically-related signals. Unfortunately, block transforms decorrelate information within the extent of each block but do not decorrelate between blocks. In audio coding applications, the correlation between blocks can be very high.

Hybrid coding systems utilizing transforms, LPC and quantization have been explored. Redundant information is reduced by block transforms which decorrelate blocks of information and by linear prediction which reduces correlation between blocks, and irrelevant information is reduced by quantization according to psycho-perceptual principles. For example, see Lazzari, et al., "Two Speech Coders for Digital Mobile Radio," *CSELT Technical Reports*, vol. 16, no. 6, October 1988, pp. 563–572 (hereafter referred to as "Lazzari"), Mahieux, et at., "Transform Coding of Audio Signals Using Correlation Between Successive Transform Blocks," *IEEE ICASSP Proceedings*, 1989, pp. 2021–2024 (hereafter referred to as "Mahieux"), and Lin, et at., "Subband-Multipulse Digital Audio Broadcasting for Mobile Receivers," *IEEE Trans. on Broadcasting*, vol. 39, no. 4, December 1993, pp. 373–382 (hereafter referred to as "Lin"), all of which are incorporated by reference in their entirety. In these references, an encoder quantizes the prediction error of predictors applied to one or more subband signals derived from a filter bank.

The technique disclosed by Lazzari applies a short-term linear predictor to two of the four subbands derived from cascaded Quadrature Mirror Filters (QMF). Lazzari concludes that the removal of temporal redundancies is more effective if the number of subbands is limited to four. The subband bandwidths are considerably wider than the critical bands of the human auditory system. A predictor of order 6 is used for the lowest frequency subband signal having the highest correlation between samples and a predictor of order 4 is used for the second subband signal. Prediction is performed over signal frames of approximately 15 msec. An additional predictor to remove longer-term redundancies was considered and rejected because it offers too little gain for the added complexity. A third subband signal is encoded using an adaptive pulse code modulation scheme without prediction.

The technique disclosed by Lin applies a modified multipulse excited linear predictive coder to four subbands derived from two cascaded QMF. The subband bandwidths are considerably wider than the critical bands of the human auditory system. Lin explains that wider subbands are used because the correlation between adjacent samples in narrower subbands is not high enough to obtain high prediction accuracy. In one embodiment, predictors of order 6,4,4,4 are used for the respective four subband signals over an analysis frame length of 20 msec. An additional long term predictor is used because it provides an improvement in subjective quality when the excitation pulse density is low.

Because of the very wide subband bandwidths, the techniques disclosed by Lazzari and by Lin are unable to fully utilize psycho-perceptual effects to render quantizing noise inaudible.

The technique disclosed by Mahieux applies a magnitude/phase predictor to transform coefficients derived from a Discrete Fourier Transform (DFT). In one disclosed embodiment, a 512-point DFT generates transform coefficients, a first-order predictor predicts transform coefficient magnitude, and two first-order predictors predict transform coefficient phase change. The prediction errors for the peak-valued transform coefficients are quantized using nonuniform quantization for the magnitude and uniform quantization for the phase change. The magnitudes of other transform coefficients of lesser significance are quantized using nonuniform quantizers. The quantizers for the prediction errors are reinitialized whenever a sharp transient in the signal is encountered. Unfortunately, the disclosed predictors do not work well for complex waveforms containing multiple spectral components within the bandwidth of a transform coefficient; a coding system according to the disclosed technique generates tone-like signals in response to noise-like signals. In addition, side information is required to convey when quantizers are reinitialized.

Each of the techniques disclosed in the references cited above are unable to achieve a satisfactory combination of critical band filtering and prediction accuracy. On the one hand, good prediction accuracy can be obtained for information in wider subbands but quantization errors are more difficult to render inaudible. On the other hand, quantization errors can be rendered inaudible more easily in narrower subbands but prediction accuracy is degraded to such an extent that it provides very little if any benefit. The use of higher-order predictors in narrow subbands has not yielded significant improvement; Mahieux indicates that in the disclosed system a fourth-order predictor provides only about 2 dB higher predictive gain than a first-order predictor.

DISCLOSURE OF INVENTION

It is an object of the present invention to provide for a high-quality split-band coding system incorporating predictive coding which overcomes the problems discussed above.

It is another object of the present invention to provide for a high-quality split-band coding system in which predictive coding is applied or not applied as necessary to minimize perceptible degradation.

Other objects of the present invention are set forth throughout the following discussion.

In accordance with teachings of the present invention, in one embodiment, a split-band audio encoder generates subband signals having bandwidths commensurate with bandwidths of respective critical bands of the human auditory system, applies a general waveform predictor in each subband to predict the waveform of respective subband signals, quantizes the prediction error and formats the quantized prediction errors in a form suitable for transmission or storage. The order of the predictor is chosen to balance two competing interests: (1) the order is high enough to provide low prediction error so that the quantizing noise resulting from a low bit-rate quantization of the prediction error is imperceptible, and (2) the order is low enough to provide a response time commensurate with temporal masking intervals of the human auditory system.

In accordance with teachings of the present invention, in one embodiment, a split-band decoder extracts quantized prediction errors for a plurality of subbands from an encoded signal, applies a general waveform predictor to the quantized prediction errors for each subband to recover a replica of a subband signal, and generates a wideband output signal in response to the replicas of subband signals. The order of the predictor is chosen as discussed above for an encoder.

In accordance with teachings of the present invention, in one embodiment, a split-band audio encoder generates subband signals having bandwidths commensurate with bandwidths of respective critical bands of the human auditory system, applies a general waveform predictor in each subband to predict the waveform of respective subband signals, quantizes either the prediction error or the respective subband signal, whichever has the lower information capacity requirement, and formats the quantized information into a form suitable for transmission or storage.

In accordance with teachings of the present invention, in one embodiment, a split-band decoder extracts from an encoded signal subband information for a plurality of subbands, where for each subband the subband information represents either quantized prediction errors or a replica of a subband signal, applies a general waveform predictor to subband information representing quantized prediction errors to recover a replica of the respective subband signal, and generates a wideband output signal in response to the replica subband signals.

By selectively using prediction, a coding system may use a more accurate high-order predictor which has a response time exceeding the temporal masking intervals of the human auditory system. During quasi-stationary intervals, the use of a high-order predictor contributes to prediction accuracy. Following highly nonstationary events, the effects of large prediction errors may extend beyond the temporal masking interval because high-order predictors have a long response time; however, perceptible degradation is avoided or minimized by encoding the subband signal samples rather than the large prediction errors.

The present invention may be implemented in many different embodiments and incorporated into a wide variety of encoders and decoders. Although more particular mention is made of transform-based filter banks, no particular filter bank implementation is critical to the practice of the present invention. In particular, implementations may incorporate analysis filter banks which generate aliasing artifacts such as a critically-sampled Quadrature Mirror Filter (QMF) and a critically-sampled Time-Domain Aliasing Cancellation (TDAC) transform.

References to bandwidths "commensurate with critical bands" and the like should be understood to mean bandwidths which may slightly exceed the critical bands of the human auditory system, particularly at low frequencies, but preferably are narrower. References to time intervals "commensurate with temporal masking intervals" and the like should be understood to mean time intervals which may slightly exceed the temporal masking intervals of the human auditory system but preferably are shorter.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

Basic Structure

Figure 1:
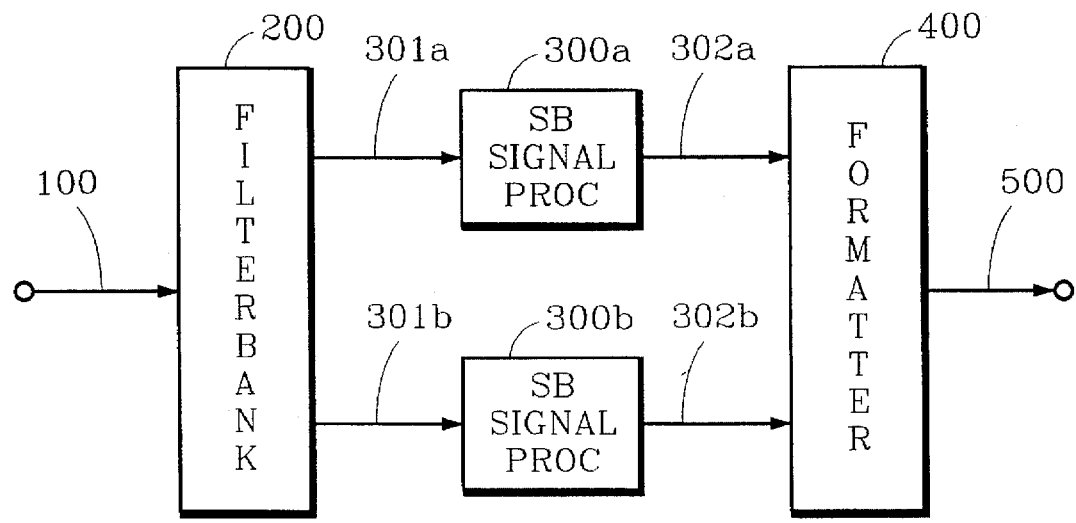
FIG. 1 is a functional block diagram of a split-band encoder incorporating subband signal processors.

FIG. 1 illustrates one embodiment of a split-band encoder incorporating various aspects of the present invention. Filter bank 200 generates a plurality of subband signals in response to an input signal received from path 100. Only two subbands are shown and discussed here for simplicity. Subband signal processor 300a processes one of the subband signals received from path 301a and passes the results of the processing along path 302a to formatter 400. Subband signal processor 300b processes another of the subband signals received from path 301b and passes the results of the processing along path 302b to formatter 400. Formatter 400 assembles the processed subband signals into a form suitable for transmission or storage and passes the formatted signal along path 500. In many embodiments, formatter 400 is essentially a multiplexor; however, the nature of the formatting is not critical to the practice of the invention.

Figure 2:
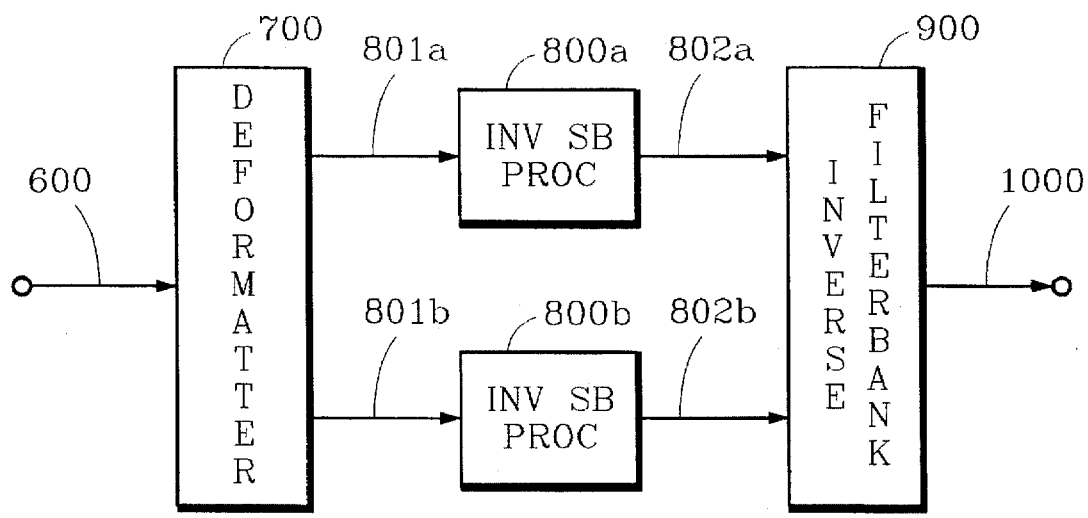
FIG. 2 is a functional block diagram of a split-band decoder incorporating inverse subband processors.

FIG. 2 illustrates one embodiment of a split-band decoder incorporating various aspects of the present invention. Deformatter 700 extracts subband information for a plurality of subbands from a formatted signal received from path 600. Inverse subband processor 800a processes information for one of the subbands received from path 801a and passes the resulting subband signal along path 802a to inverse filter bank 900. Inverse subband processor 800b processes information for another of the subbands received from path 801b and passes the resulting subband signal along path 802b to inverse filter bank 900. Inverse filter bank 900 generates an output signal along path 1000 in response to the subband signals received from paths 802a and 802b.

Figure 3:
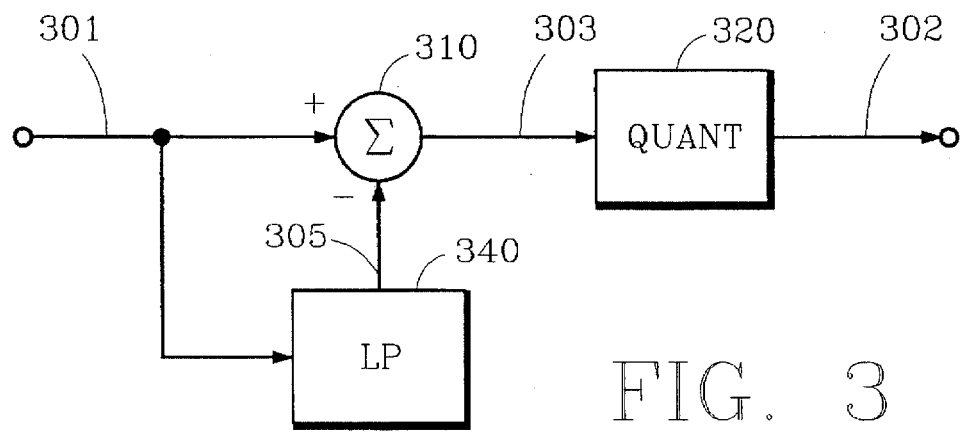
FIGS. 3–5 are functional block diagrams of embodiments of a subband signal and an inverse subband processor incorporating linear predictors and quantizers.

FIG. 3 illustrates the basic structure of one embodiment of a subband signal processor incorporating a forward predictor. Digital samples x(m,i) of a signal in subband i received from path 301 are passed to linear predictor 340 which generates predicted values p(m,i) along path 305. Combiner 310 establishes prediction errors e(m,i) by subtracting the predicted values p(m,i) received from path 305 from the subband signal samples x(m,i) received from path 301. The subband index i may be inferred for each subband signal processor; therefore, the subband index will be omitted below to simplify the discussion. Accordingly, the subband signal prediction error may be expressed as $$e(m)=x(m)-p(m) \tag{1}$$

Quantizer 320 quantizes the prediction errors received from path 303 and passes the quantized errors along path 302. Not shown in this or in any other figure are provisions for passing any required side information to the predictor in an inverse subband processor of a companion decoder.

Figure 4:
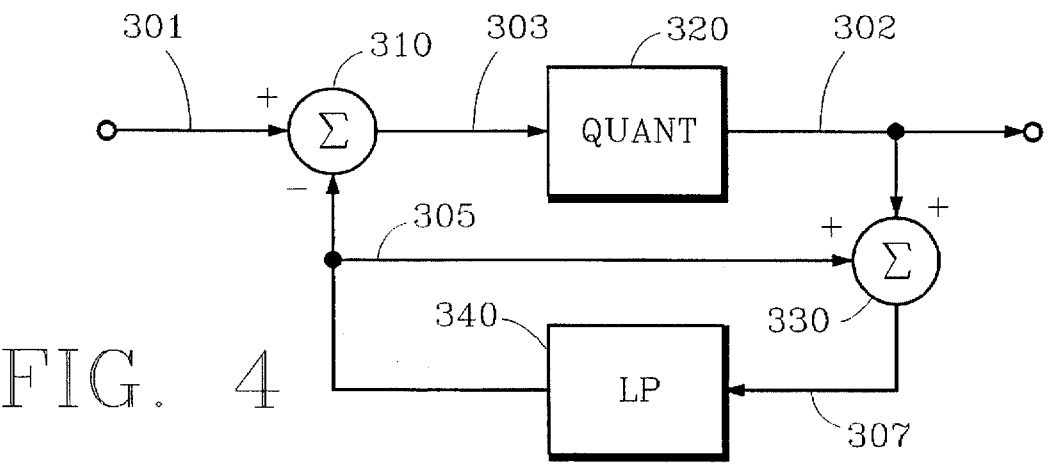

FIG. 4 illustrates the basic structure of one embodiment of a subband signal processor incorporating a backward predictor. Combiner 310 establishes prediction errors according to expression 1 and passes the errors along path 303 to quantizer 320. Quantizer 320 quantizes the prediction errors and passes the quantized errors along path 302. Combiner 330 adds predicted values received from path 305 to the quantized errors received from path 302 to recover replicas of the original subband signal samples according to $$\hat{x}(m)=p(m)+\hat{e}(m) \tag{2}$$

where $\hat{x}(m)$=recovered replica of original subband signal sample, and $\hat{x}(m)$=quantized prediction error.

Linear predictor 340 generates the predicted values along path 305 in response to the recovered replicas of subband signal samples received from path 307 according to $$p(m)=F[\hat{x}(m-1), \hat{x}(m-2), \ldots, \hat{x}(m-N)] \tag{3}$$

where F=linear predictor function, and N=order of the predictor.

Backward predictors are used in preferred embodiments of subband signal processors because no additional side information need be passed to the inverse subband processor of a companion decoder; however, no particular predictor topology is critical to the practice of the present invention. Forward predictors, backward predictors, or a hybrid of the two types may be used.

Figure 5:
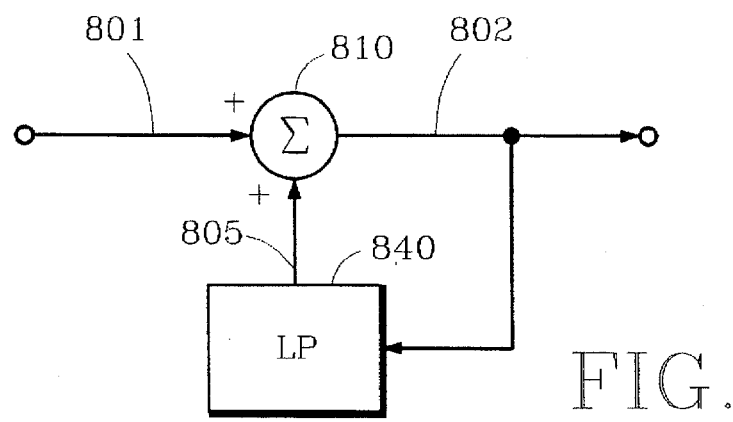

FIG. 5 illustrates the basic structure of one embodiment of an inverse subband processor incorporating a backward predictor. Combiner 810 generates along path 802 recovered replicas of subband signal samples obtained according to expression 2 by adding predicted values received from path 805 to quantized prediction errors received from path 801. Linear predictor 840 generates predicted values along path 805 in response to recovered replicas of original subband signal samples received from path 802 according to expression 3 shown above. Not shown in any figure is an embodiment of an inverse subband processor incorporating a forward predictor; however, forward predictors, backward predictors, or a hybrid of the two types may be used to practice the present invention.

Subband Bandwidth and Predictor Order

Filter bank 200 and inverse filter bank 900 may be implemented using either analog or digital filters, or a hybrid of the two. A wide variety of structures and techniques may be used to implement the filters. For ease of discussion, the following is directed more particularly toward filter banks implemented by discrete block-transforms.

The filter bank may be implemented by essentially any transform. Two transforms of particular interest are the evenly-stacked Time Domain Aliasing Cancellation (E-TDAC) transform, discussed by Princen and Bradley, "Analysis/Synthesis Filter Bank Design Based on Time Domain Aliasing Cancellation," *IEEE Trans. on Acoust., Speech, Signal Proc.*, vol. ASSP-34, 1986, pp. 1153–1161, and the oddly-stacked Time Domain Aliasing Cancellation (O-TDAC) transform discussed by Princen, Johnson, and Bradley, "Subband/Transform Coding Using Filter Bank Designs Based on Time Domain Aliasing Cancellation," *ICASSP 1987 Conf. Proc.*, May 1987, pp. 2161–64. No particular transform is critical to the practice of the present invention. For ease of discussion, the remainder of this description will generally assume a filter bank implemented by the O-TDAC transform.

As explained above, embodiments incorporating transform-based filter banks must utilize a transform length which balances competing interests. The transform length must be long enough to provide a spectral resolution fine enough to support perceptual-based coding, yet must be short enough to provide a temporal resolution fine enough to restrict audible quantizing noise from sudden events such as transients to intervals commensurate with the temporal masking interval of the human auditory system. Furthermore, the additional computational requirements of longer transforms and any temporal resolution requirements dictated by the application must also be considered. Corresponding considerations also apply to filter banks implemented using other techniques such as the quadrature mirror filter (QMF).

The spectral resolution of a transform is the coefficient bandwidth which may be approximated as the quotient of the input signal bandwidth divided by the number of distinct coefficients generated by the transform. The number of distinct coefficients for many transforms is equal to half of the transform length, where "transform length" is understood to mean the number of input samples or "points" in a block to which the transform is applied. For example, a 512-point transform such as a Discrete Fourier Transform (DFT) or one of the TDAC transforms mentioned above is applied to blocks of 512 input samples and generates 256 distinct transform coefficients. It is assumed here for simplicity that the bandwidth of all transform coefficients is the same; however, some transforms such as the DFT and the E-TDAC transforms generate first and/or last coefficients which have a bandwidth equal to half the bandwidth of all other coefficients. These variations in bandwidth may be accounted for as desired but are ignored in this discussion for simplicity. Throughout this discussion it is assumed that a transform of length 2N generates N distinct equal-bandwidth transform coefficients. Appropriate changes may be made for other types of transforms.

For digital signals, the input signal bandwidth is considered to be half the sampling rate. In systems coding digital audio signals sampled at a rate of 44.1 k samples per second, the coefficient bandwidth of a 128-point transform is approximately 345 Hz, which is wider than the critical bandwidths at low frequencies. The coefficient bandwidth of a 256-point transform and a 512-point transform are approximately 172 Hz and 86 Hz, respectively, which are commensurate with the critical bandwidths at low frequencies.

The temporal resolution of a transform is influenced by the analysis windows, the amount of overlap between adjacent time-domain sample blocks, and the length of the block interval. The effective temporal resolution of the O-TDAC filter bank is approximately one-half the block interval for the time-domain sample block, which is equal to one-half the number of samples in the block divided by the sampling rate. In systems coding digital audio signals sampled at a rate of 44.1 k samples per second, the block interval for a 128-sample block is approximately 1.5 msec. The block interval for 256- and 512-sample blocks are approximately 3 msec. and 6 msec., respectively, which are somewhat longer than premasking intervals. The temporal resolution for the 256-point transform and, hence, the risk of artifacts becoming audible to an average listener is marginally acceptable for single-generation coding applications but has been found unacceptable for multi-generation coding applications.

Embodiments incorporating general waveform prediction must utilize predictors having an order which balances competing interests. The order must be high enough to provide a prediction accuracy great enough to achieve a reduction in information capacity requirements by coding the prediction error rather than the original signal, yet must be low enough to provide a response time commensurate with temporal masking intervals. Furthermore, the additional computational requirements of higher-order predictors and any temporal resolution requirements dictated by the application must also be considered.

With respect to temporal masking, the response time for the predictor need only consider postmasking intervals which are generally regarded to be approximately 50 msec. The maximum order of the predictor may be approximated by dividing the maximum allowable predictor response time by the interval between adjacent subband signal samples or coefficients. This interval is essentially the same as the temporal resolution of the transform. For preferred embodiments using the O-TDAC filter bank with signals at 44.1 k samples per second, the maximum order for the predictors used to predict coefficients for 512-, 256- and 128-point transforms are approximately 8, 17 and 33, respectively.

A minimum order of three is required to accurately predict a single-frequency sinusoidal waveform; however, greater orders are usually required because each transform coefficient typically represents a bandwidth containing spectral energy for several frequencies. Empirical evidence has shown that the practical minimum orders for coefficient bandwidths of 86 Hz (512-point transform), 172 Hz (256-point transform) and 345 Hz (128-point transform) are approximately 4, 6 and 8, respectively.

In a preferred embodiment of a split-band encoder for encoding an audio signal sampled at 44.1 k samples per second, the O-TDAC filter bank is implemented by a 128-point modified DCT and each transform coefficient is processed by a linear predictor of order 10. The temporal resolution of the filter bank is sufficient to constrain quantizing errors of even multi-generation coded signals to an interval commensurate with temporal masking intervals. The response time of the linear predictor is also commensurate with temporal masking intervals. The spectral resolution of the filter bank is sufficient to fully exploit psychoacoustic masking effects for all but the lowest-frequency transform coefficients; however, the prediction accuracy is sufficient to achieve an overall reduction in information capacity requirements. Although additional bits may be required to encode the lowest-frequency coefficients to ensure quantization noise is masked, the required number of additional bits is less than the number of bits saved by linear prediction reducing block-to-block redundancies.

In alternative embodiments, the order of the predictor may be allowed to vary with the bandwidth of the subbands over all or most of the spectrum. For example, the order may be set equal to three times the bandwidth of each subband where the bandwidth is expressed in terms of critical bandwidths. This arrangement can be approximated by setting the order equal to some multiple of the bandwidth expressed in octaves for subbands above about 100 Hz, for example, approximately nine times the bandwidth for subbands with center frequencies between 500 Hz and 1 kHz, fifteen times the bandwidth for subbands between 1 kHz and 4 kHz, and decreasing to approximately nine times the bandwidth for subbands above about 10 kHz.

Adaptive Prediction

Figure 6:
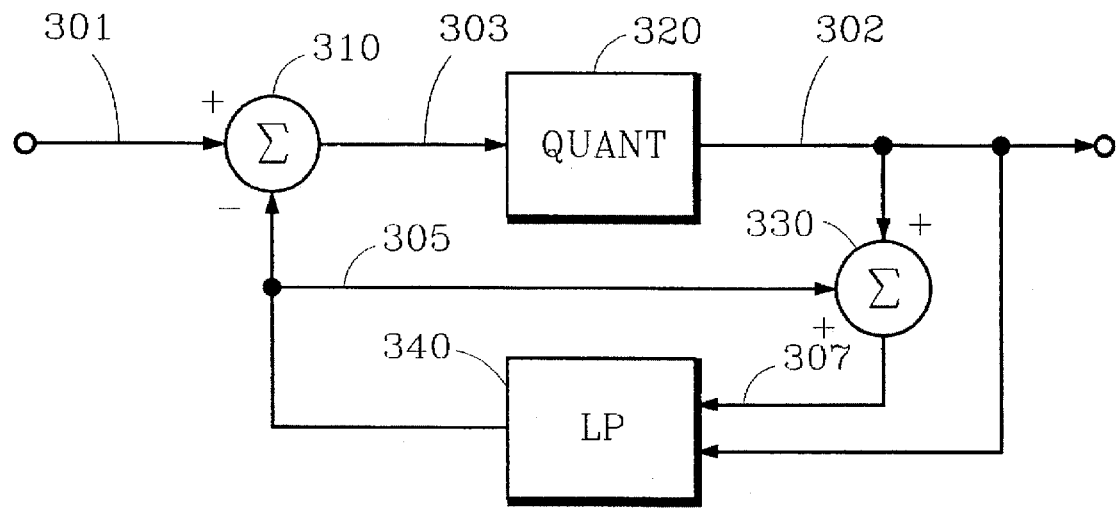
FIGS. 6–7 are functional block diagrams of embodiments of a linear predictor illustrating the flow of information used to update predictive filter coefficients.

FIG. 6 illustrates the basic structure of another embodiment of a subband signal processor incorporating a backward predictor. The structure and operation of this embodiment are substantially the same as the structure and operation of the embodiment illustrated in FIG. 4 and discussed above. In this second embodiment, linear predictor 340 receives quantized prediction errors from path 302 to adapt predictive filter coefficients.

Figure 7:
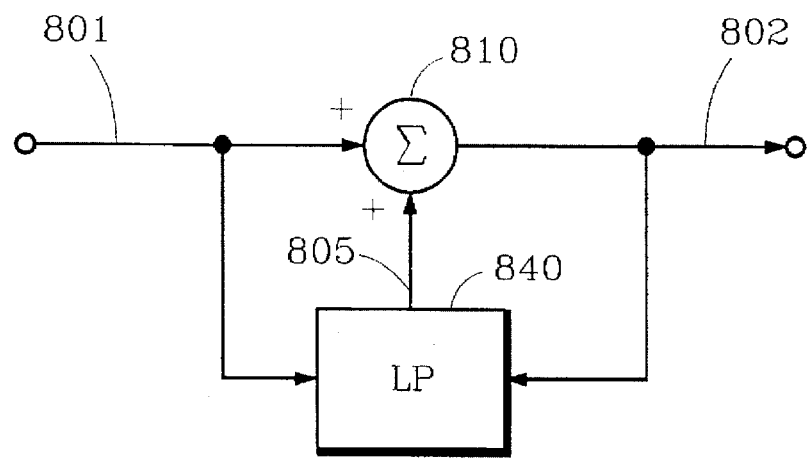

FIG. 7 illustrates the basic structure of another embodiment of an inverse subband processor incorporating a backward predictor. The structure and operation of this embodiment are substantially the same as the structure and operation of the embodiment illustrated in FIG. 5 and discussed above. In this second embodiment, linear predictor 840 receives quantized prediction errors from path 801 to adapt predictive filter coefficients.

In one embodiment of a predictive filter, the predictor function F in expression 3 may be expressed as:

$$p(m) = F[x(m-1), x(m-2), \ldots, x(m-N)] \quad (4)$$
$$= C_1(m) \cdot x(m-1) + C_2(m) \cdot x(m-2) + \ldots + C_N(m) \cdot x(m-N)$$

where $C_j(m)$=predictive filter coefficient j used to predict sample x(m).

Such a predictive filter with constant filter coefficients may be used in the embodiments illustrated in FIGS. 3 through 5. It may also be used as a forward predictor in the embodiment illustrated in FIG. 3 by adapting the filter coefficients from information received from a path not illustrated.

In preferred embodiments, the predictive filter coefficients are updated according to the expression:

$$C_j(m) = C_j(m-1) + k(m) \cdot \hat{e}(m) \cdot \hat{x}(m-1) \quad (5)$$

where k(m)=prediction convergence coefficient. The value of the convergence coefficient is adapted to minimize the response time of the predictor by maximizing the speed of predictor convergence yet maintaining stability. Occasional predictor instability is tolerable, however, if predictor "override" is used. Predictor override is discussed below.

Predictor convergence is influenced by signal amplitude, prediction filter order, and the form of the quantizer used to quantize prediction errors. Preferably, the value of the convergence coefficient is established according to these same factors. In particular, predictor convergence can be relatively insensitive to changes in signal amplitude if the convergence coefficient varies inversely to signal amplitude. In one embodiment, the convergence coefficient is inversely proportional to the square of signal amplitude and inversely proportional to the square root of predictor order. Odd-symmetric quantization functions are generally preferred because, unlike even-symmetric quantization functions, they can be both unbiased and provide a zero-level quantization level for low-level signals. In principle, any measure of signal amplitude may be used to derive the convergence coefficient; however, either the peak or the root-mean-square (RMS) value of a signal within an given interval are convenient choices. In one embodiment, k(m) is established according to $$k(m) = \frac{w}{\sqrt{N} \cdot \max[x^2(m), x^2(m-1), \ldots, x^2(m-N)]} \quad (6)$$

w=weighting factor, max[a,b, . . . ,c]=maximum of the values in the set {a,b, . . . ,c}, and N=order of the predictive filter.

In an embodiment in which signal samples x(m) may range from −1 to 1, the weighting factor w is approximately equal to 0.1.

It is usually desirable to inhibit adaptation of predictive filter coefficients for very small-amplitude signals, particularly when the amplitude is so small that the signal is obscured by noise. This may be accomplished in a variety of ways. One simple way sets k(m) to a small value, say one, when the maximum signal amplitude in expression 6 is less than some threshold value, say 180 dB below peak amplitude. Adaptation may also be inhibited by setting the second term in the right-hand side of equation 5 equal to or substantially equal to zero.

It should be pointed out that a single set of predictive filter coefficients may be used with filter banks implemented by the E-TDAC technique even though that filter bank alternates the application of a modified Discrete Cosine Transform (DCT) and a modified Discrete Sine Transform (DST). Because the spectrum of the modified DCT and the modified DST are in quadrature with respect to one another, the samples generated by each transform must be processed separately by the predictor but the same predictive filter coefficients may be used. In preferred embodiments, the predictive filter coefficients are adapted in a manner similar to that described above.

Alternative Adaptive Prediction

A closed form of predictor adaptation may be used as an alternative to a basic form of adaptation such as any of those described above. The alternative form may be used in a respective frequency subband during periods when the signal in the subband is essentially a sine wave, thereby allowing the predictor to converge more quickly, preventing backward predictors from drifting away from the actual signal, and reducing the amount of side information required to convey adaptation information for forward predictors. This alternative form is based on the fact that a sine wave can be expressed exactly by only three samples; hence, by examining four or more of the latest samples in a particular subband, it is possible to determine whether the signal in that subband is essentially a sine wave. This determination can be made for each subband by periodically extrapolating a sine wave from recent samples or transform coefficients in the subband, finding the difference between the extrapolated sine wave and the current sample or transform coefficient, and comparing this difference with the prediction error obtained from the predictor as adapted according to a basic method such as those described above. If the difference is less than the prediction error, the subband signal is considered to be essentially a sine wave and the predictor can be immediately set to generate the appropriate sine wave. If the difference is larger than the prediction error, the basic form of predictor adaptation can continue. An appropriate flag or other control information can be passed in the encoded signal to inform a decoder to adapt its predictor appropriately.

If filter bank 200 is implemented with block transforms, the determination can be made for each block by examining transform coefficients in the current block with the corresponding transform coefficients in three or more previous blocks. If filter bank 200 is implemented with filters other than block transforms, the determination can be made for each sample in the subband by comparing the current sample with three or more previous samples. The number of previous samples and the frequency of the determination can be established according to the needs of the coding application.

Prediction Override

The design of the predictor must take into account the required accuracy of prediction, the required speed of convergence, and the stability of the predictor in view of highly nonstationary events and quantization of prediction errors. As explained above, these characteristics are competing factors which require compromise in design. Another aspect of the present invention referred to as "prediction override" may be used to advantage in some applications to reduce the need to compromise predictor design. Prediction override determines whether the information capacity requirements of an encoded subband signal are lower using prediction. If it is, prediction errors of the subband signal samples are encoded. If it is not, some representation of the subband signal samples is encoded. This representation may be the subband signal sample values themselves or it may be a derived value such as, for example, some form of differential value. The following discussion assumes that the subband signal samples themselves are encoded.

Figure 8:
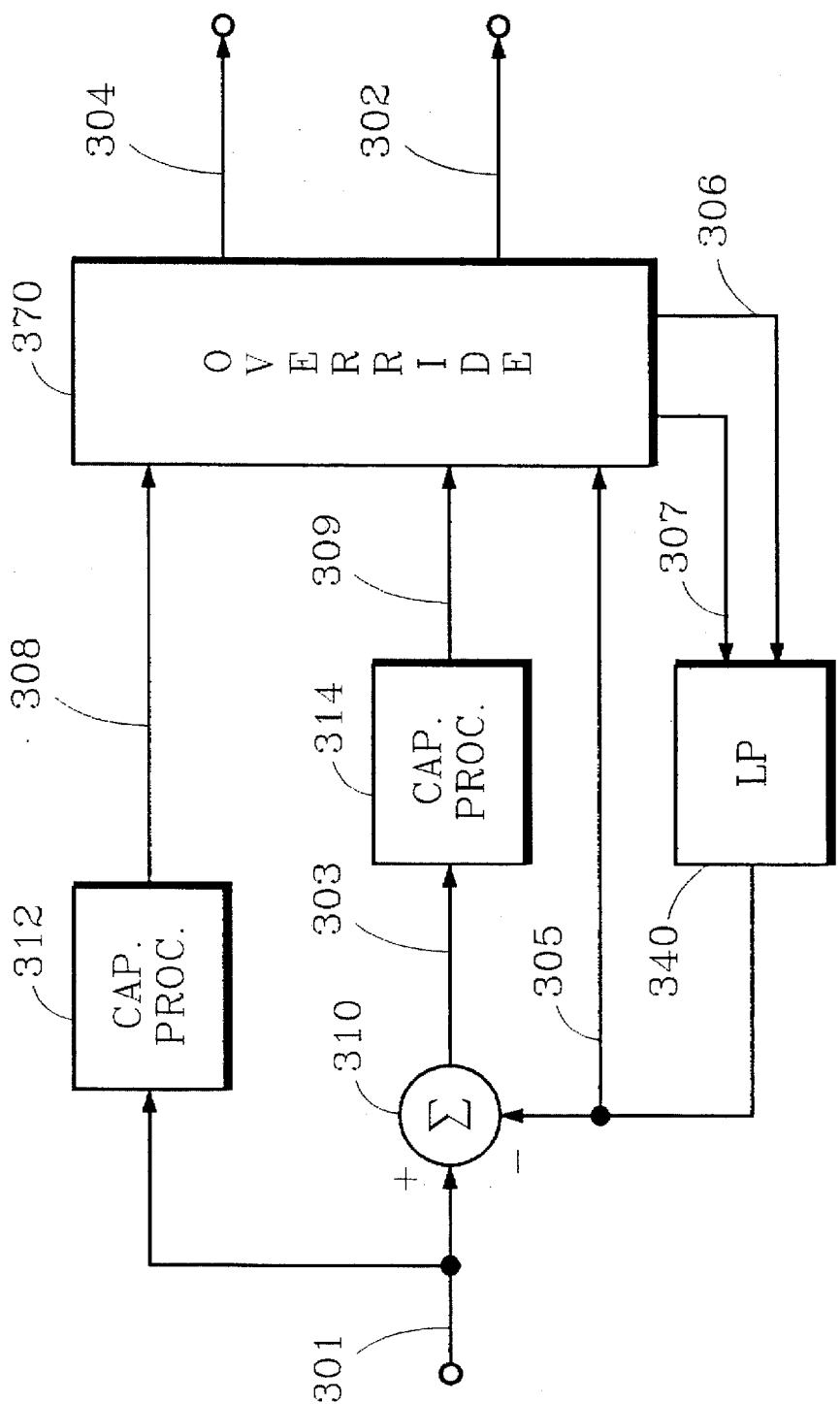
FIG. 8 is a functional block diagram of an embodiment of a subband signal processor incorporating a predictor with provision for prediction override.

FIG. 8 illustrates the basic structure of one embodiment of a subband signal processor incorporating a backward predictor with prediction override. Capacity processor 312 passes along path 308 both the subband signal samples and a measure of subband signal information capacity requirements in response to subband signal samples received from path 301. Combiner 310 establishes prediction errors according to expression 1, shown above, and passes the errors along path 303 to capacity processor 314. Capacity processor 314 passes along path 309 both the prediction errors and a measure of the information capacity requirements of the prediction errors. Override 370 analyzes the capacity requirement measures received from paths 308 and 309, establishes whether the subband signal samples or the prediction errors impose the larger information capacity requirement, quantizes the signal imposing the lower requirement, and passes quantized prediction errors and recovered replicas of original subband signal samples to linear predictor 340 along paths 307 and 308, respectively. Linear predictor 340 adapts predictive filter coefficients in response to quantized prediction errors received from path 306 and generates along path 305 prediction values in response to recovered replicas received from path 307.

In one implementation, the capacity processors generate a measure of information capacity requirement by establishing a block-floating-point exponent for the signal samples. The capacity requirement varies inversely with the value of the exponent. For subbands comprising a single transform coefficient, the exponent applies uniquely to one signal value. In subbands comprising two or more transform coefficients, the exponent applies to two or more signal values. In other implementations, the measure may be a function of some other signal level such as peak, RMS, average, or a scale factor of the signal samples. In yet other implementations, the capacity processors may estimate information capacity requirements from signal characteristics other than magnitude. Although the choice of function used to generate the measure can significantly affect coding system performance, no particular function is critical to the inventive concept.

Figure 9:
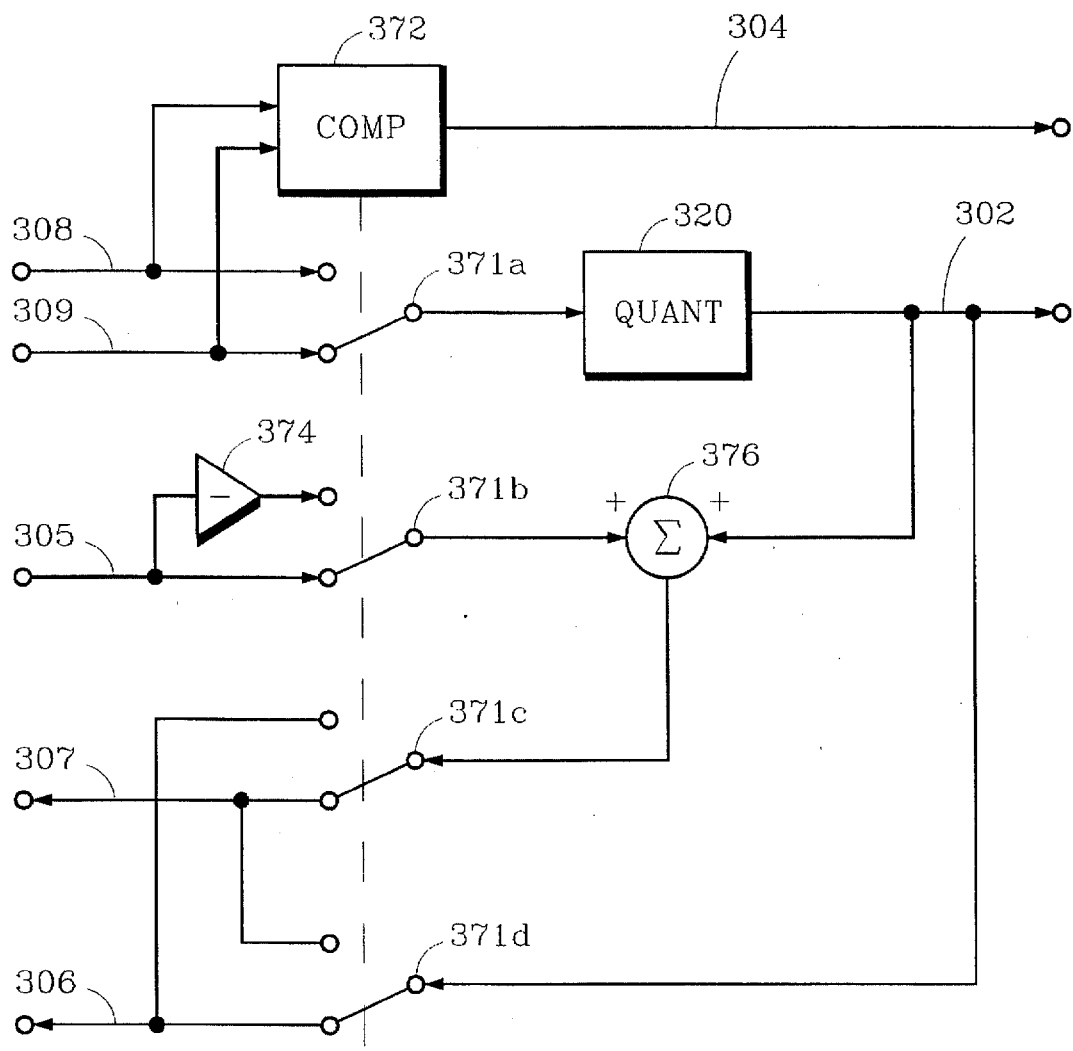
FIG. 9 is a functional block diagram of an embodiment of a prediction override controller for a subband signal processor.

FIG. 9 illustrates the basic structure of one embodiment of prediction override 370. In this embodiment, comparator 372 compares the capacity requirement measures received from paths 308 and 309. If the information capacity requirement for the subband signal samples received from path 308 is higher, comparator 372 causes each of the switches 371a–371d to switch to the lower positions as shown in the figure, and generates along path 304 a "false" override signal indicating that prediction errors are to be quantized and coded. If, however, the capacity requirement for the prediction errors received from path 309 is higher, comparator 372 causes each of the switches 371a–371d to switch to the upper positions, and generates along path 304 a "true" override signal indicating that subband signal samples are to be quantized and coded.

Under control of comparator 372, switch 371a passes either subband signal samples received from path 308 or prediction errors received from path 309 to quantizer 320 which quantizes the information and passes the quantized information along path 302. Both the quantized information on path 302 and the override signal on path 304 are subsequently assembled by formatter 400 into an encoded signal for transmission or storage.

Under control of comparator 372, switches 371b–371d ensure that quantized prediction errors are passed along path 306 and recovered replicas of original subband signal samples are passes along path 307. If prediction errors are quantized and encoded, each of the switches is switched to the lower position as shown in the figure. Combiner 376 generates recovered replicas of the original subband signal samples according to expression 2 by adding the predicted values, received from path 305 through switch 371b, to the quantized prediction errors, received from path 302. Switch 371c passes the recovered replicas along path 307 and switch 371d passes the quantized prediction errors along path 306.

If subband signal samples are quantized and encoded, each of the switches is switched to the upper position. Switch 371b receives from inverter 374 an inverted form of the predicted values and passes them to combiner 376 which generates quantized prediction errors by subtracting the predicted values from the quantized subband signal samples received from path 302. Switch 371c passes the quantized prediction errors along path 306 and switch 371d passes the recovered replicas along path 307.

Figure 10:
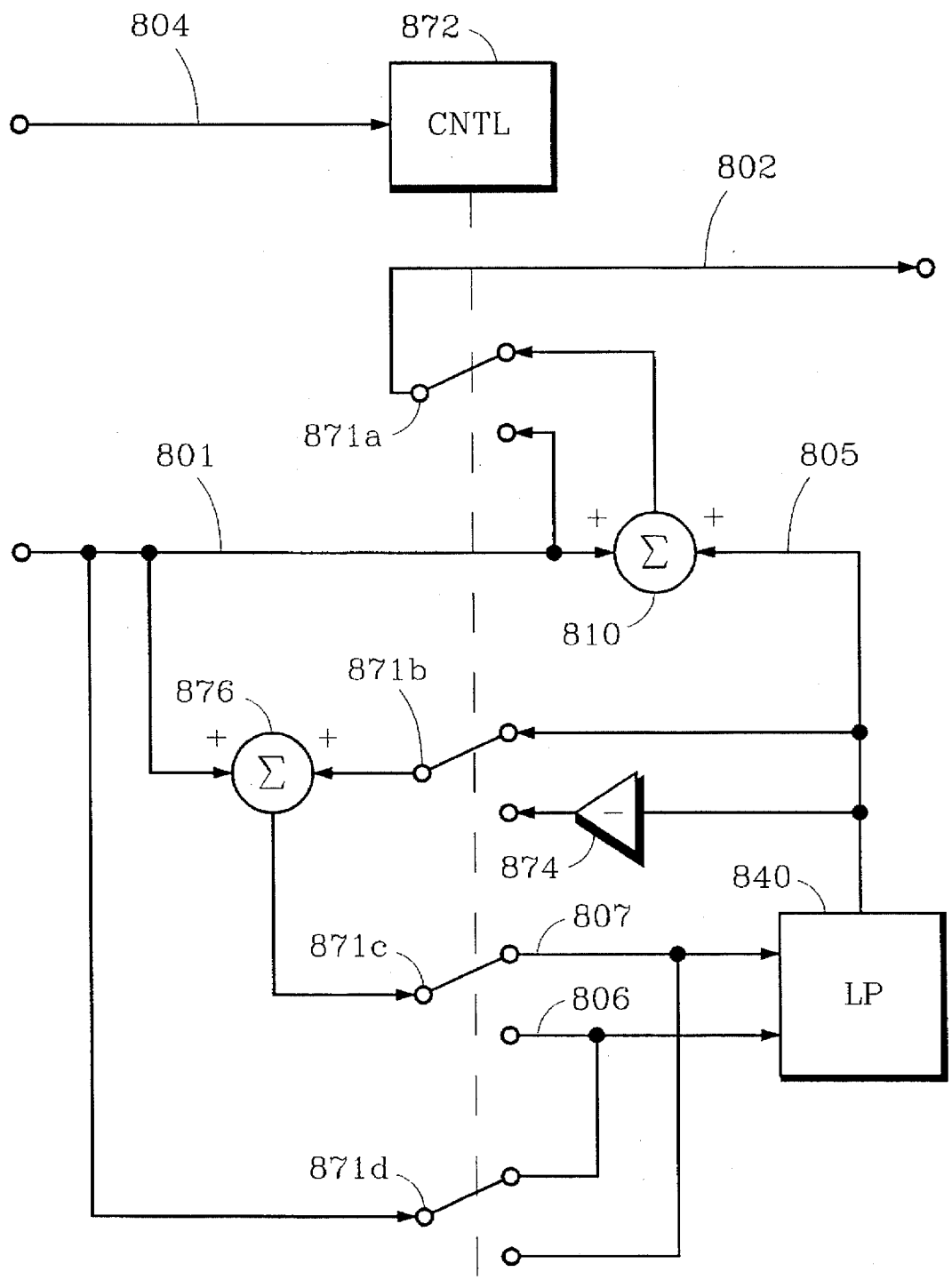
FIG. 10 is a functional block diagram of an embodiment of a prediction override controller for an inverse subband processor.

FIG. 10 illustrates the basic structure of one embodiment of prediction override control for use in an inverse subband processor. In this embodiment, quantized information received from deformatter 700 via path 801 may be either quantized subband signal samples or quantized prediction errors. Control 872 receives from deformatter 700 via path 804 a prediction override signal. If the prediction override signal is false, control 872 causes switches 871a–871d to switch to the upper positions as shown in the figure. If the override signal is true, control 872 causes switches 871a–871d to switch to the lower positions.

In response to control 872, switch 871a passes along path 802 recovered replicas of original subband signal samples.

When the override signal is false and the switches are in the upper positions, combiner 810 recovers a replica of the original subband signal samples by combining predicted values, received from linear predictor 840 via path 805, with quantized prediction errors, received from path 801. When the override signal is true and the switches are in the lower positions, replicas of the original subband signal samples are received directly from path 801.

In response to control 872, switches 371b–371d ensure that quantized prediction errors are passed along path 806 and recovered replicas of original subband signal samples are passed along path 807 to linear predictor 840. If quantized prediction errors are received from path 801, each of the switches is switched to the upper positions as shown in the figure. Combiner 876 generates recovered replicas of the original subband signal samples according to expression 2 by adding the predicted values, received from path 805 through switch 871b, to the quantized prediction errors, received from path 801. Switch 871c passes the recovered replicas along path 807 and switch 871d passes the quantized prediction errors along path 806.

If quantized subband signal samples are received from path 801, each of the switches is switched to the lower positions. Switch 871b receives from inverter 874 an inverted form of the predicted values and passes them to combiner 876 which generates quantized prediction errors by subtracting the predicted values from the quantized subband signal samples received from path 801. Switch 871c passes the quantized prediction errors along path 806 and switch 871d passes the recovered replicas along path 807.

Linear predictor 840 adapts predictive filter coefficients in response to quantized prediction errors received from path 806 and generates along path 805 predicted values in response to recovered replicas received from path 807.

I claim:

1. An encoding method comprising the steps of:
   receiving an input signal representing audio information,
   generating a plurality of subband signals, each subband signal corresponding to a respective frequency subband of said input signal having a bandwidth commensurate with or less than a corresponding critical band of human perception,
   generating subband information by predicting a respective subband signal using a waveform predictor having an order greater than or equal to a minimum order, said minimum order equal to three, and
   formatting an encoded signal by assembling said subband information into a form suitable for transmission or storage.

2. An encoding method according to claim 1 wherein said waveform predictor is implemented by a digital filter having filter coefficients adapted in response to a recovered replica of said respective subband signal.

3. An encoding method according to claim 1 wherein said respective subband signal comprises samples having a time interval between adjacent samples, and wherein said waveform predictor has an order of not more than a maximum order substantially equal to the postmasking interval of the human auditory system divided by said time interval.

4. An encoding method comprising the steps of:
   receiving an input signal representing audio information,
   generating a plurality of subband signals, each subband signal corresponding to a respective frequency subband of said input signal having a bandwidth commensurate with or less than a corresponding critical band of human perception,
   generating quantized information by processing a respective subband signal, said processing comprising the steps of:
   generating a predicted signal by applying a predictor to said respective subband signal, said predictor having an order greater than or equal to a minimum order, said minimum order equal to three,
   generating a prediction error signal from the difference between said respective subband signal and said predicted signal, and
   generating said quantized information by quantizing said prediction error signal, and
   formatting an encoded signal by assembling said quantized information into a form suitable for transmission or storage.

5. An encoding method according to claim 4 wherein said predictor is implemented by a digital filter having filter coefficients adapted in response to a recovered replica of said respective subband signal.

6. An encoding method according to claim 4 wherein said respective subband signal comprises samples having a time interval between adjacent samples, and wherein said predictor has an order of not more than a maximum order substantially equal to the postmasking interval of the human auditory system divided by said time interval.

7. An encoding method according to claim 3 or 6 wherein said subband signals are generated by applying a discrete transform to said input signal, and wherein said minimum order is equal to 4, 6 and 8 for discrete transform lengths of 512, 256 and 128, respectively.

8. An encoding method according to claim 7 wherein said discrete transform substantially corresponds to either an evenly-stacked Time Domain Aliasing Cancellation transform or an oddly-stacked Time Domain Aliasing Cancellation transform.

9. An encoding method according to claim 2 or 5 wherein said filter coefficients are adapted at a rate varying inversely with amplitude of said respective subband signal.

10. An encoding method according to claim 4 further comprising a step for determining information requirements of said prediction error signal and said respective subband signal, wherein said quantized information is generated by quantizing said respective subband signal rather than said prediction error signal when the information requirements of said respective subband signal is lower than said prediction error signal.

11. An encoding method according to claim 1 or 4 wherein said input signal comprises input signal samples and each of said subband signals comprise one or more transform coefficients, said transform coefficients generated by applying a transform to said input signal.

12. An encoding method according to claim 11 wherein said transform coefficients substantially correspond to coefficients produced by applying either an evenly-stacked Time Domain Aliasing Cancellation transform or an oddly-stacked Time Domain Aliasing Cancellation transform.

13. A decoding method comprising the steps of:
   receiving an encoded signal representing audio information and obtaining therefrom subband information for respective frequency subbands of said audio information having bandwidths commensurate with or less than a corresponding critical band of human perception,
   generating a respective subband signal for each of a plurality of subbands by applying a waveform predictor to subband information for a respective subband, said predictor having an order greater than or equal to a minimum order, said minimum order equal to three, and generating a replica of said audio information in response to said respective subband signal for each of a plurality of subbands.

14. A decoding method according to claim 13 wherein, for a respective subband, said waveform predictor is implemented by a digital filter having filter coefficients adapted in response to said subband signal.

15. A decoding method according to claim 13 wherein said respective subband signal comprises samples having a time interval between adjacent samples, and wherein said waveform predictor has an order of not more than a maximum order substantially equal to the postmasking interval of the human auditory system divided by said time interval.

16. A decoding method comprising the steps of:
receiving an encoded signal representing audio information and obtaining therefrom subband information for respective frequency subbands of said audio information having bandwidths commensurate with or less than a corresponding critical band of human perception, wherein said subband information corresponds to either prediction errors or a subband signal,
generating a respective subband signal for each subband represented by subband information corresponding to prediction errors by applying a predictor to the subband information, said predictor having an order greater than or equal to a minimum order, said minimum order equal to three, and
generating a replica of said audio information in response to said respective subband signal for each of said subbands.

17. A decoding method according to claim 16 wherein, for a respective subband, said predictor is implemented by a digital filter having filter coefficients adapted in response to said subband signal.

18. A decoding method according to claim 16 wherein said respective subband signal comprises samples having a time interval between adjacent samples, and wherein said predictor has an order of not more than a maximum order substantially equal to the postmasking interval of the human auditory system divided by said time interval.

19. A decoding method according to claim 15 or 18 wherein said replica of said audio information is generated by applying an inverse discrete transform to subband signals in said plurality of subbands, and wherein said minimum order is equal to 4, 6 and 8 for inverse discrete transform lengths of 512, 256 and 128, respectively.

20. A decoding method according to claim 19 wherein said inverse discrete transform substantially corresponds to either an evenly-stacked Time Domain Aliasing Cancellation inverse transform or an oddly-stacked Time Domain Aliasing Cancellation inverse transform.

21. A decoding method according to claim 14 or 17 wherein said filter coefficients are adapted at a rate varying inversely with amplitude of said respective subband signal.

22. A decoding method according to claim 13 or 16 wherein said subband signal comprises transform coefficients, said replica of said audio information generated by applying an inverse transform to said subband signal for each of a plurality of subbands.

23. A decoding method according to claim 22 wherein said inverse transform substantially corresponds to either an evenly-stacked Time Domain Aliasing Cancellation inverse transform or an oddly-stacked Time Domain Aliasing Cancellation inverse transform.

24. An encoder comprising:
an input terminal,
a plurality of bandpass filters coupled to said input terminal, said bandpass filters having respective center frequencies and respective passband bandwidths commensurate with or narrower than critical bands of the human auditory system,
a prediction circuit coupled to a respective bandpass filter, said prediction circuit comprising a prediction filter and a quantizer, said prediction filter having an order greater than or equal to a minimum order, said minimum order equal to three, and
a multiplexor coupled to said linear prediction circuit.

25. An encoder according to claim 24 wherein a respective one of said bandpass filters is implemented by a digital filter generating digital values having a time interval between adjacent digital values, and wherein said prediction filter coupled to said respective bandpass filter has an order of not more than a maximum order substantially equal to the postmasking interval of the human auditory system divided by said time interval.

26. An encoder comprising:
an input terminal,
a plurality of bandpass filters coupled to said input terminal, said bandpass filters having respective center frequencies and respective passband bandwidths commensurate with or narrower than critical bands of the human auditory system,
a prediction circuit having an input coupled to a respective bandpass filter and having an output, said prediction circuit comprising a prediction filter having an order greater than or equal to a minimum order, said minimum order equal to three,
a comparator having a first input, a second input and an output, said first input of said comparator coupled to said respective bandpass filter and said second input of said comparator coupled to said output of said prediction circuit,
a switch control coupled to said output of said comparator,
a switch with a first input, a second input and an output, said first input of said switch coupled to said respective bandpass filter and said second input of said switch coupled to said output of said prediction circuit, wherein said output of said switch is switchably connected to either said first input of said switch or said second input of said switch in response to said switch control,
a quantizer having an input coupled to said output of said switch and having an output, and
a multiplexor coupled to said output of said quantizer.

27. An encoder according to claim 26 wherein a respective one of said bandpass filters is implemented by a digital filter generating digital values having a time interval between adjacent digital values, and wherein said prediction filter coupled to said respective bandpass filter has an order of not more than a maximum order substantially equal to the postmasking interval of the human auditory system divided by said time interval.

28. An encoder according to claim 25 or 27 wherein said plurality of bandpass filters is implemented by a time-domain to frequency-domain transform, and wherein said minimum order is equal to 4, 6 and 8 for transform lengths of 512, 256 and 128, respectively.

29. An encoder according to claim 28 wherein said transform substantially corresponds to either an evenly-stacked Time Domain Aliasing Cancellation transform or an oddly-stacked Time Domain Aliasing Cancellation transform.

30. An encoder according to claim 24 or 26 wherein said plurality of bandpass filters is implemented by a time-domain to frequency-domain transform.

31. An encoder according to claim 30 wherein said transform substantially corresponds to either an evenly-stacked Time Domain Aliasing Cancellation transform or an oddly-stacked Time Domain Aliasing Cancellation transform.

32. An encoder according to claim 24 or 26 wherein said prediction filter comprises a filter tap having a weighting circuit, said weighting circuit coupled to said quantizer.

33. A decoder comprising:

an input terminal, a demultiplexor having an input and a plurality of outputs, said input of said demultiplexor coupled to said input terminal, a prediction circuit coupled to a respective one of said plurality of outputs of said demultiplexor, said prediction circuit comprising a prediction filter having an order greater than or equal to a minimum order, said minimum order equal to three, and a plurality of inverse bandpass filters having respective center frequencies and respective passband bandwidths commensurate with or narrower than critical bands of the human auditory system, a respective one of said plurality of inverse bandpass filters coupled to said prediction circuit.

34. A decoder according to claim 33 wherein a respective one of said prediction filters is implemented by a digital filter generating digital values having a time interval between adjacent digital values, said respective prediction filter having an order of not more than a maximum order substantially equal to the postmasking interval of the human auditory system divided by said time interval.

35. A decoder comprising:

an input terminal, a demultiplexor having an input and a plurality of demultiplexor outputs, said input of said demultiplexor coupled to said input terminal, a prediction circuit having an input coupled to a respective one of said plurality of demultiplexor outputs and having an output, said prediction circuit comprising a prediction filter having an order greater than or equal to a minimum order, said minimum order equal to three, a switch control coupled to said respective one of said plurality of demultiplexor outputs, a switch with a first input, a second input and an output, said first input of said switch coupled to said respective one of said plurality of demultiplexor outputs and said second input of said switch coupled to said output of said prediction circuit, wherein said output of said switch is switchably connected to either said first input of said switch or said second input of said switch in response to said switch control, and a plurality of inverse bandpass filters having respective center frequencies and respective passband bandwidths commensurate with or narrower than critical bands of the human auditory system, a respective one of said plurality of inverse bandpass filters coupled to said output of said switch.

36. A decoder according to claim 35 wherein a respective one of said prediction filters is implemented by a digital filter generating digital values having a time interval between adjacent digital values, said respective prediction filter having an order of not more than a maximum order substantially equal to the postmasking interval of the human auditory system divided by said time interval.

37. A decoder according to claim 34 or 36 wherein said plurality of inverse bandpass filters are implemented by a frequency-domain to time-domain transform, and wherein said minimum order is equal to 4, 6 and 8 for transform lengths of 512, 256 and 128, respectively.

38. A decoder according to claim 37 wherein said transform substantially corresponds to either an evenly-stacked Time Domain Aliasing Cancellation inverse transform or an oddly-stacked Time Domain Aliasing Cancellation inverse transform.

39. A decoder according to claim 33 or 35 wherein said plurality of inverse bandpass filters are implemented by a frequency-domain to time-domain transform.

40. A decoder according to claim 39 wherein said transform substantially corresponds to either an evenly-stacked Time Domain Aliasing Cancellation inverse transform or an oddly-stacked Time Domain Aliasing Cancellation inverse transform.

41. A decoder according to claim 33 or 35 wherein said prediction filter comprises a filter tap having a weighting circuit, said weighting circuit coupled to said respective one of said plurality of outputs of said demultiplexor.

* * * * *